United States Patent
Puri et al.

(10) Patent No.: US 11,500,697 B2
(45) Date of Patent: Nov. 15, 2022

(54) COMPLEX SYSTEM FOR KNOWLEDGE LAYOUT FACILITATED EPICENTER ACTIVE EVENT RESPONSE CONTROL

(71) Applicant: Accenture Global Solutions Limited, Dublin (IE)

(72) Inventors: Colin Anil Puri, Walnut Creek, CA (US); Teresa Sheausan Tung, Tustin, CA (US)

(73) Assignee: Accenture Global Solutions Limited, Dublin (IE)

( * ) Notice: Subject to any disclaimer, the term of this patent is extended or adjusted under 35 U.S.C. 154(b) by 434 days.

(21) Appl. No.: 16/841,956

(22) Filed: Apr. 7, 2020

(65) Prior Publication Data

US 2021/0311810 A1    Oct. 7, 2021

(51) Int. Cl.
G06F 17/00         (2019.01)
G06F 9/54          (2006.01)
G06N 5/02          (2006.01)
G06K 9/62          (2022.01)
(Continued)

(52) U.S. Cl.
CPC ............... *G06F 9/542* (2013.01); *G06F 9/50* (2013.01); *G06F 9/5005* (2013.01); *G06F 9/54* (2013.01);
(Continued)

(58) Field of Classification Search
CPC .......... G06F 9/542; G06F 9/50; G06F 9/5005; G06F 9/54; G06F 11/30; G06F 11/3065; G06F 11/3072; G06F 11/32; G06F 11/321; G06F 11/324; G06F 11/327; G06F 11/328; G06K 9/6215; G06K 9/6272; G06N 5/00; G06N 5/02; G06N 5/022; G06N 5/025; G06N 5/045; G06N 20/00; G06Q 10/08355
See application file for complete search history.

(56) References Cited

U.S. PATENT DOCUMENTS

2005/0033761 A1* 2/2005 Guttman ................ G06N 5/022
                                                      707/999.102
2017/0032262 A1* 2/2017 Gerken .................. G06N 5/048
(Continued)

OTHER PUBLICATIONS

Schmidt, Kay-Uwe, Darko Anicic, and Roland Stühmer. "Event-driven reactivity: A survey and requirements analysis." 3rd International Workshop on Semantic Business Process Management. 2008 (Year: 2008).*

(Continued)

*Primary Examiner* — Andrew T McIntosh
(74) *Attorney, Agent, or Firm* — Crowell & Moring LLP (57) ABSTRACT

A system maintains a knowledge layout to support the analysis of active events and determination of epicenter and aftershock nodes via an event reach stack. At an input layer of the event reach stack, the system may receive active event data. At a semantic layer, the system may parse the active event data to determine event phrases. Based on the event phrases, the system may identify epicenter nodes directly affected by the active event. At an analytic model layer, the system may successively determine aftershock nodes by traversing the knowledge layout outward from the epicenter nodes. The system then directs the response to the active event to the aftershock and epicenter nodes, via action at a focus response layer of the event reach stack.

20 Claims, 5 Drawing Sheets

(51) Int. Cl.
  *G06Q 10/08* (2012.01)
  *G06F 11/32* (2006.01)
  *G06F 11/30* (2006.01)
  *G06N 5/00* (2006.01)
  *G06F 9/50* (2006.01)
  *G06N 5/04* (2006.01)

(52) U.S. Cl.
  CPC .......... *G06F 11/30* (2013.01); *G06F 11/3065* (2013.01); *G06F 11/3072* (2013.01); *G06F 11/32* (2013.01); *G06F 11/321* (2013.01); *G06F 11/324* (2013.01); *G06F 11/327* (2013.01); *G06F 11/328* (2013.01); *G06K 9/6215* (2013.01); *G06K 9/6272* (2013.01); *G06N 5/00* (2013.01); *G06N 5/02* (2013.01); *G06N 5/022* (2013.01); *G06N 5/025* (2013.01); *G06N 5/045* (2013.01); *G06Q 10/08355* (2013.01)

(56) References Cited

U.S. PATENT DOCUMENTS

| | | | |
|---|---|---|---|
| 2018/0082122 A1* | 3/2018 | Verdejo | G06V 20/80 |
| 2018/0103052 A1* | 4/2018 | Choudhury | G06N 3/08 |
| 2018/0150750 A1* | 5/2018 | Verdejo | G06V 10/84 |
| 2021/0279599 A1* | 9/2021 | Carbune | G06N 5/022 |

OTHER PUBLICATIONS

Hare, Mary, et al. "Activating event knowledge." Cognition 111.2 (2009): 151-167 (Year: 2009).*

Paulius, David, Ahmad B. Jelodar, and Yu Sun. "Functional object-oriented network: Construction & expansion." 2018 IEEE International Conference on Robotics and Automation (ICRA). IEEE, 2018 (Year: 2018).*

* cited by examiner

COMPLEX SYSTEM FOR KNOWLEDGE LAYOUT FACILITATED EPICENTER ACTIVE EVENT RESPONSE CONTROL

TECHNICAL FIELD

This disclosure relates to analytics model-based analysis to facilitate active event response control.

BACKGROUND

Rapid advances in electronics and communication technologies, driven by immense customer demand, have resulted in the widespread adoption of communication technology supported services. As one example, communications-based tracking and support of delivery logistics has transformed the commercial parcel delivery service marketplace. Improvements in the integration of communication-based technologies into service support will continue to increase the features and options available to service customers and providers of services.

DETAILED DESCRIPTION

The various techniques and architectures described below implement knowledge layouts (e.g., a knowledge graph, resource description framework, or other schematic mapping of resources) to build event and analytical models in parity as descriptors (e.g., for data, resources, analytics model templates, parties, events, or other descriptor targets) are onboarded into the knowledge layout. The event models provide a data snapshot of the conditions and available resources (including, for example, technical machine and computing resources) for response to those conditions. Analytical models may be used to select actions for response to identified sets of conditions (e.g., active events). Analytical models may be used to determine a magnitude of an effect from an active event on a resource (including physical resources) represented by a node.

In some cases, through various data input pathways managed by an input layer of an event reach stack (ERS), a system may determine a set of conditions making up an active event may be present. For example, a pre-defined set or dynamically identified set of conditions making up a specific active event may be detected. Based on the detection of the set of conditions, the system may determine that an active event is occurring. Responsive to the active event, the system may parse the event data received regarding the active event to determine an epicenter, for example the set of nodes on the knowledge layout representing the resources affected directly by the event. In other words, epicenter may include the set of nodes for which at least of the effect from the event is not mediated though a relationship with another node. Rather, the effects of the active event itself result in changes in the node without necessarily first requiring a change at another node.

The effects on the epicenter nodes may result in aftershocks. Aftershock nodes may include nodes indirect affected by the active event. In other words, aftershock nodes are the nodes affected by the active event through mediation from another node. The aftershock-order of a node may be an indication of the level of indirectness, severity, and/or time-lag from the active event. The ERS may successively calculate epicenter and aftershock effects to determine a group of nodes experiencing effects or predicted to experience effects directly or indirectly from an active event. For example, the active event may include a natural disaster (e.g., earthquake, hurricane, volcanic eruption, or other natural disaster), a product recall, an epidemic, a software update, or virtually any event liable to affect operations of one or more organizations.

Once a group of nodes affected by an active event has been determined, the event reach stack may further issue instructions to ensure that resources a focused on nodes experience or expected to experience effects serious enough to warrant response and or effect expected to occur soon enough that prioritizing other nodes would be detrimental to the efficacy of the response as a whole. Accordingly, the ERS may increase the efficacy and efficiency of hardware computing system used in event modelling and event response Additionally or alternatively, the ERS may generate a presentation (e.g., a user interface window) of the affected nodes (e.g., a selected subset of the knowledge layout with epicenter nodes and aftershock nodes). The presentation may indicate the aftershock order of the aftershock nodes.

Figure 1:
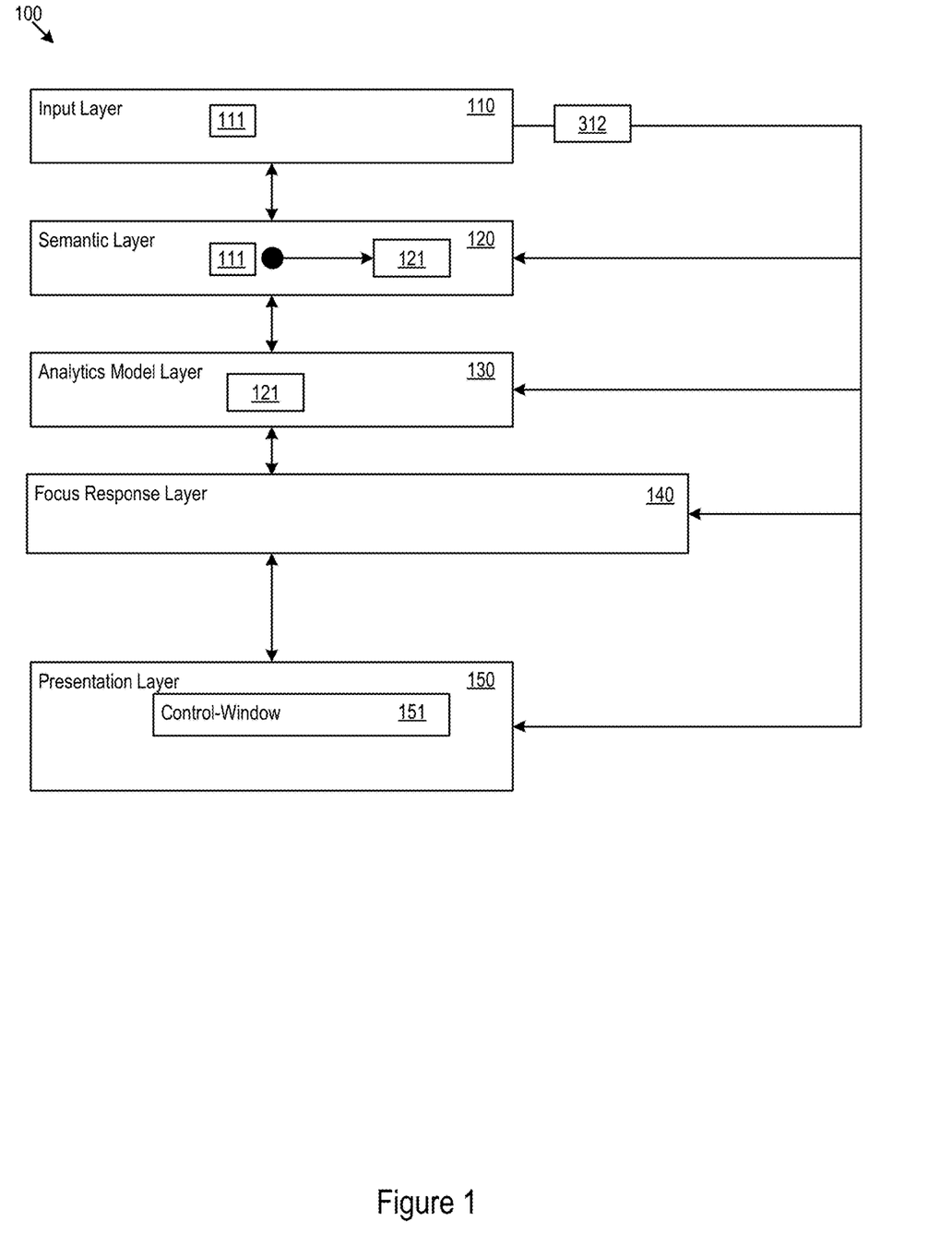
FIG. 1 shows an example multiple-layer event reach stack.

Referring now to FIG. 1, an example multiple-layer ERS 100 is shown. The hardware portions of the multiple-layer ERS 100 may be implemented as event reach circuitry. The ERS 100 may include an input layer 110, which may handle active event data 111 reception (e.g., extraction, transformation, and/or loading of data) and networking resource access for the other layers (e.g., hardware access to the communication interfaces 312 discussed below); a semantic layer 120 which handle data parsing and epicenter node identification; a analytics model layer 130, which may knowledge layout traversal and aftershock node discovery; an focus response layer 140, which may ensure response resources are directed to affected nodes (e.g., with effects meeting selected criteria); and/or a presentation layer 150, which may handle presentation of display windows showing selected nodes (such as epicenter and aftershock nodes).

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the ERS 100, the input layer may provide the analytics model layer 130 with network data access to obtain metadata on resources within the knowledge layout and/or network resource support during knowledge layout traversal. Hence, the input layer 110 may provide a hardware resource, e.g., network interface circuitry resources, to the analytics model layer 130. Accordingly, the multiple-layer stack architecture of the event resolution knowledge stack may improve the functioning of the underlying hardware.

Figure 2:
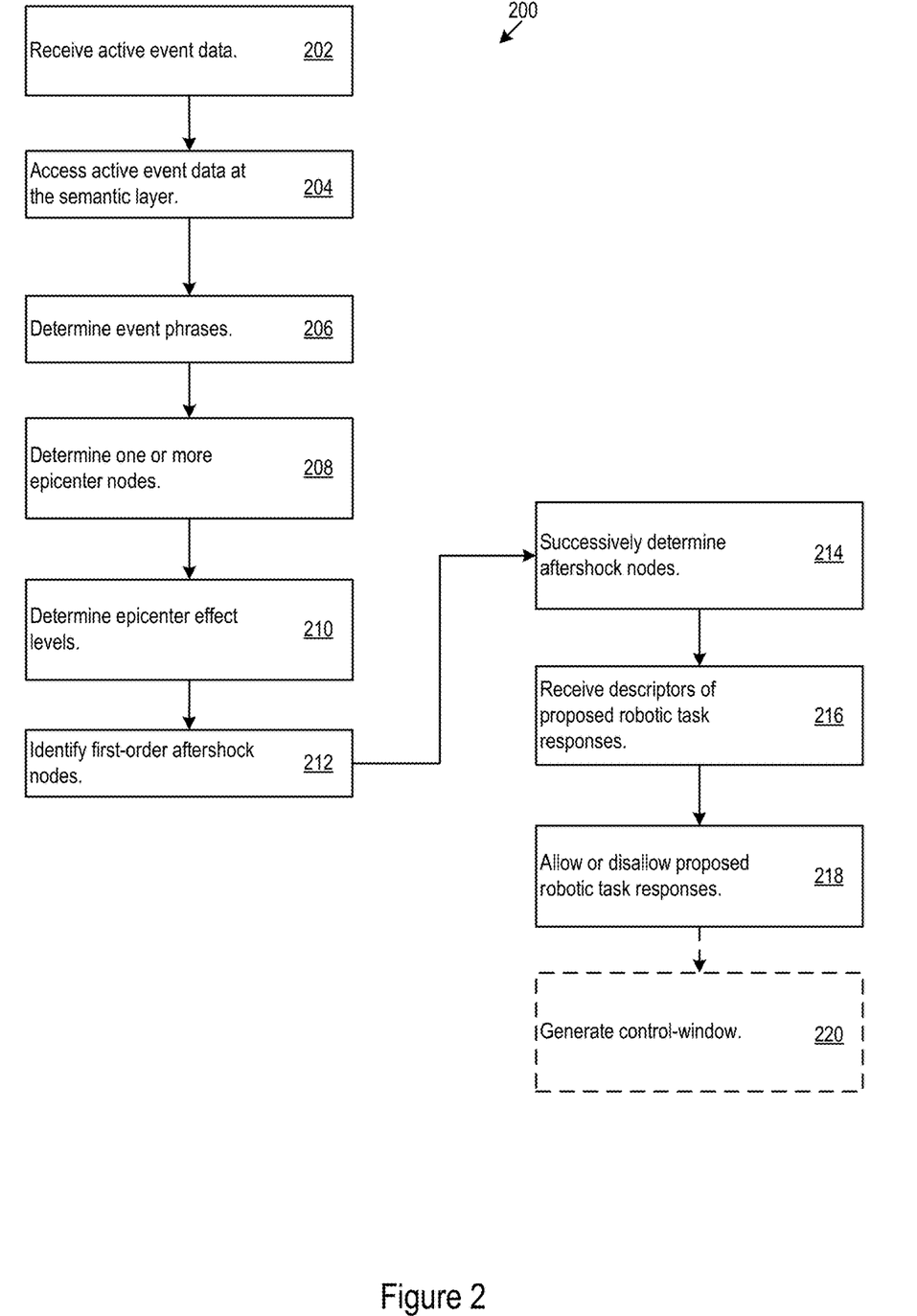
FIG. 2 shows example event reach logic.

Continuing to refer to FIG. 1, FIG. 2, which shows example event reach logic (ERL) 200 that governs the operation of the ERS 100, is now also discussed. At the input layer 110, the ERL 200 may receive (e.g., via one or more network interface circuitry operations) active event data 111 associated with an active event (202). The active event data may include descriptions of the active event and/or captured data (e.g., news reports, sensor data, witness reports, monitoring data, or other data related to the active event). The active event may include virtually any event liable to affect operations on or by any of the resources mapped to the nodes of the knowledge layout. For example, a natural disaster may affect raw, refined, and/or manufactured material sources. Accordingly, the ERL 200 may capture event data related to a natural disaster for determination whether material-source nodes (or virtually any other node mapped to a resource in the region of the natural disaster) is affected by the natural disaster. The active event may include geographically-localized events (natural disasters, epidemics, fires, regional labor strikes, traffic jams, riots, sports events, political events, or other events with a geographically-localized direct effect). The active event may include operationally-defined events (e.g., software bugs, process errors, hardware updates, firmware deployments, cloud computing updates, manufacturing defects, or other events defined by an operational component). Operationally-defined events may not necessarily be geographically-localized. Rather, operationally-defined events may directly affect nodes representing resources using the operational component in question regardless of a physical location.

At the semantic layer 120, the ERL 200 may access the active event data 111 (204). For example, the access may be facilitated by hardware resource provision (e.g., networking and/or memory hardware access) by the input layer 110. At the semantic layer 120, the ERL 200 may parse the active event data to determine event phrases 121 (206). The event phrases 121 may include data elements, (e.g., strings, data chunks, or other data) that may assist in determining the nature of the active event and/or the directly affected resources.

After determining directly affected resources, the ERL 200 (e.g., operating at the semantic layer 120) may identify the nodes mapped to the directly affected resources to determine one or more epicenter nodes (208).

Using the identified epicenter nodes, the ERL 200 (e.g., operating at the analytics model layer 130) may determine epicenter event effect levels (e.g., magnitudes, time-lag, or other effect levels) for the epicenter effects (210). The ERL 200 may use various modeling tools (e.g., machine learning classifiers, deep learning tool, inference systems, and/or other modeling tools) to predict and/or measure effects at the epicenter nodes.

Based on the epicenter nodes, the ERL 200 may, at the analytics model layer 130, traverse the knowledge layout (e.g., following node relationships outward) to identify first-order aftershock nodes (212). Aftershock nodes may be located by identifying nodes that represent resources that are operationally-dependent on the epicenter nodes (or on nodes that are operationally-dependent on the epicenter nodes). For example, a first node that is dependent on some output, status, or other condition from a second node may be operationally-dependent on the second node. As an illustrative example, a material-source node may represent a source of a raw material used at a manufacturing plant represented by manufacturing-plant node. Because the manufacturing plant's output is dependent on access to the raw material from the material-source node, the manufacturing plant node is operationally-dependent on the material-source node.

In some cases, the ERL 200 may traverse the knowledge layout by evaluating active event effect magnitudes at neighboring nodes to known epicenter and aftershock nodes to identify new aftershock nodes.

The order of an aftershock node may be an indication of severity of effect from the active event. The order of an aftershock node may be determined based on the magnitude of the effect on the aftershock node (e.g., in reference to the magnitude of the effect on the relevant epicenter node and/or an absolute scale). The order of an aftershock node may be determined based on the level of directness of the effect (e.g., the number of intervening aftershock nodes between the epicenter node and the aftershock node in question). The order of an aftershock node may be determined based on the time delay between the effect on the aftershock node and the initial effect on the epicenter nodes (e.g., with the resulting aftershock order establishing a temporal ordering of effects). In some implementations, multiple factors (e.g., directness, time-lag, and/or magnitude of effect) may be used in determining aftershock order. In some implementations, epicenter nodes may be treated as zero-order aftershock nodes.

In some cases, the order of an aftershock node may be determined based on knowledge layout proximity to an epicenter node. For example, the aftershock-order of a node may be the number of jumps from the aftershock node to an epicenter node on the knowledge layout.

In some implementations, for example where directness of effect is not necessarily a factor in determining aftershock order, epicenter nodes may be assigned an order (e.g., other than zero) dependent on the same criteria other aftershock nodes are classified on. In other words, in some cases, epicenter nodes may be treated identically to other aftershock nodes and afforded no special status based solely on experiencing a direct effect from the active event.

The ERL 200 may successively determine aftershock nodes (e.g., at the analytics model layer 130) (214). For example, based on the effects at first-order aftershock nodes, the ERL 200 may traverse the knowledge layout to identify second-order aftershock nodes (and so on with third-order, fourth-order, . . . , n-order). The ERL 200 may continue to determine aftershock nodes until a negligible-order aftershock node is determined. A negligible-order aftershock node may include a node for which the effect from the active event fails to meet one or more criteria for severity. For example, the effect is too time-delayed to be considered (e.g., above a maximum threshold for time-lag). In an example, the negligible-order effect may have a magnitude below a minimum threshold. In an example, the negligible-order effect may have an indirectness level that is too high (e.g., too many intervening aftershock nodes between the negligible-order aftershock node and the relevant epicenter node).

Once the aftershock and epicenter nodes are determined, the ERL 200, at the focus response layer 140, may direct response resources towards the aftershock and epicenter nodes (and away from unaffected (or insignificantly affected) nodes). For example, the may direct robotic tasks. A robotic task may include virtually any machine-based or automated response that generates a real world outcome. For example, a robotic task may include: making a hotel reservation; scheduling repairs to a machine, optionally including software repairs; redirection of a physical shipment; initiating a currency, credit, or tokenized transaction; activating an actuator; activating a light emitting diode (LED) or other light source; applying brakes in a vehicle; a system model deployment; enterprise-internal system invocation; third-party service invocation; requesting emergency support; or other real world response.

In some implementations, the ERL 200 may receive descriptors of proposed or robotic task responses (216). For example, a next action layer of an event resolution stack, such as that described in U.S. Provisional Patent Application No. 62/877,921, filed Jul. 24, 2019, and entitled Complex System for Knowledge Layout Facilitate Analytics-Based Action Selected, which is incorporated herein in its entirety, may propose a response to the active event and send a descriptor of the response and the relevant target node of the response. Based on the received descriptor, ERL may determine whether the proposed robotic task response is directed at (or is calculated to affect) an aftershock node and/or an epicenter node. Based on the target of the proposed robotic task response, the ERL 200 may allow or disallow the proposed robotic task response (218). As an illustration, for the example of the next action layer of the event resolution stack, the ERL 200 may determine whether the relevant target node is with the group of epicenter and aftershock nodes. Based on the relevant target node's inclusion (or exclusion) from the group the ERL 200 may, at the focus response layer allow (or disallow) the proposed response.

In some implementations, the ERL 200, at the focus response layer 140, may send listings of epicenter and aftershock nodes to response systems (e.g., such as the event resolution stack) to solicit, passively direct, and/or initiate responses focused on the epicenter and aftershock nodes.

In some implementations, the ERL 200 may, at the presentation layer 150, generate a control-window 151 for presentation of portions of the knowledge layout (e.g., on a graphical user interface) (220). The ERL 200 may, through the control-window, display the epicenter and aftershock nodes (e.g., by displaying only those nodes, displaying a region of the knowledge layout include those nodes, or by displaying another selected portion of the knowledge layout). In some cases, the ERL 200 may cause the display of nodes within a user-selected aftershock order, and (in some cases) display tools to allow the user to adjust the currently viewed aftershock order (e.g., a slider input adjustable from "epicenter only" to "orders above the negligible-order aftershock").

Figure 3:
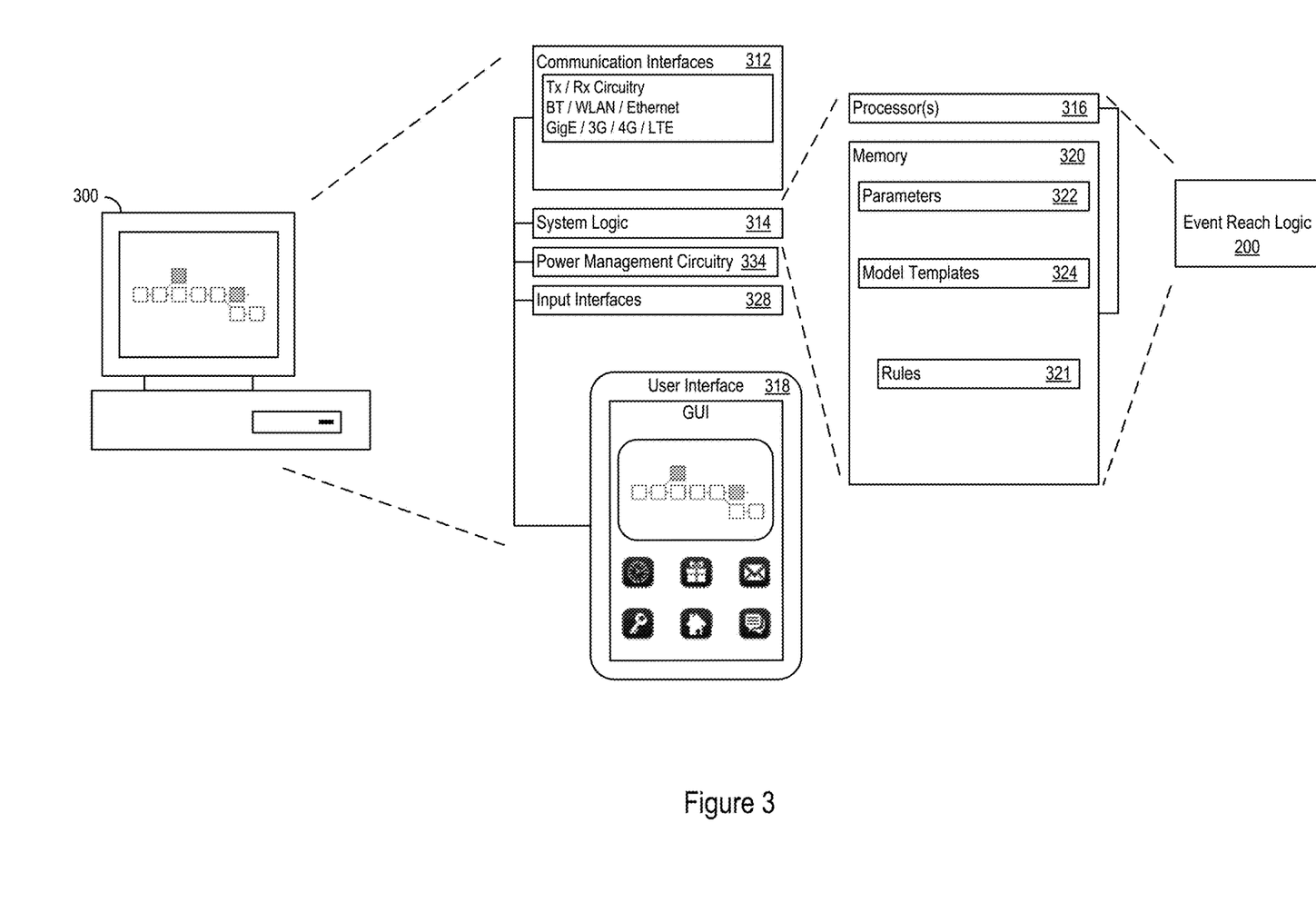
FIG. 3 shows an example execution environment.

FIG. 3 shows an example execution environment (EE) 300 for implementing the ERS 100. The EE 300 may include system logic 314 to support tasks described herein. The system logic 314 may include processors 316, memory 320, and/or other circuitry, which may be used to implement ERL 200, which may provide software support to implement the various tasks performed by the ERS 100.

The memory 320 may be used to store parameters 322 and/or model templates 324 used in the analytics models. The memory 320 may further store selection rules 321, that may facilitate selection of actions and/or analytics models and/or identification of epicenter or aftershock nodes.

The memory 320 may further include applications and structures, for example, coded objects, templates, or one or more other data structures to support identification of epicenter or aftershock nodes. The EE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the communication layer as network interface circuitry, with data sources or resources used to invoke selected action or other parties to facilitate operation of the ERS 100. Additionally or alternatively, the communication interface 312 may support secure information exchanges, such as secure socket layer (SSL) or public-key encryption-based protocols for sending and receiving private data. The EE 300 may include power management circuitry 334 and one or more input interfaces 328.

The EE 300 may also include a user interface 318 that may include man-machine interfaces and/or graphical user interfaces (GUI). The GUI may be used to present interfaces and/or options to operators involved in identification of epicenter or aftershock nodes.

Figure 4:
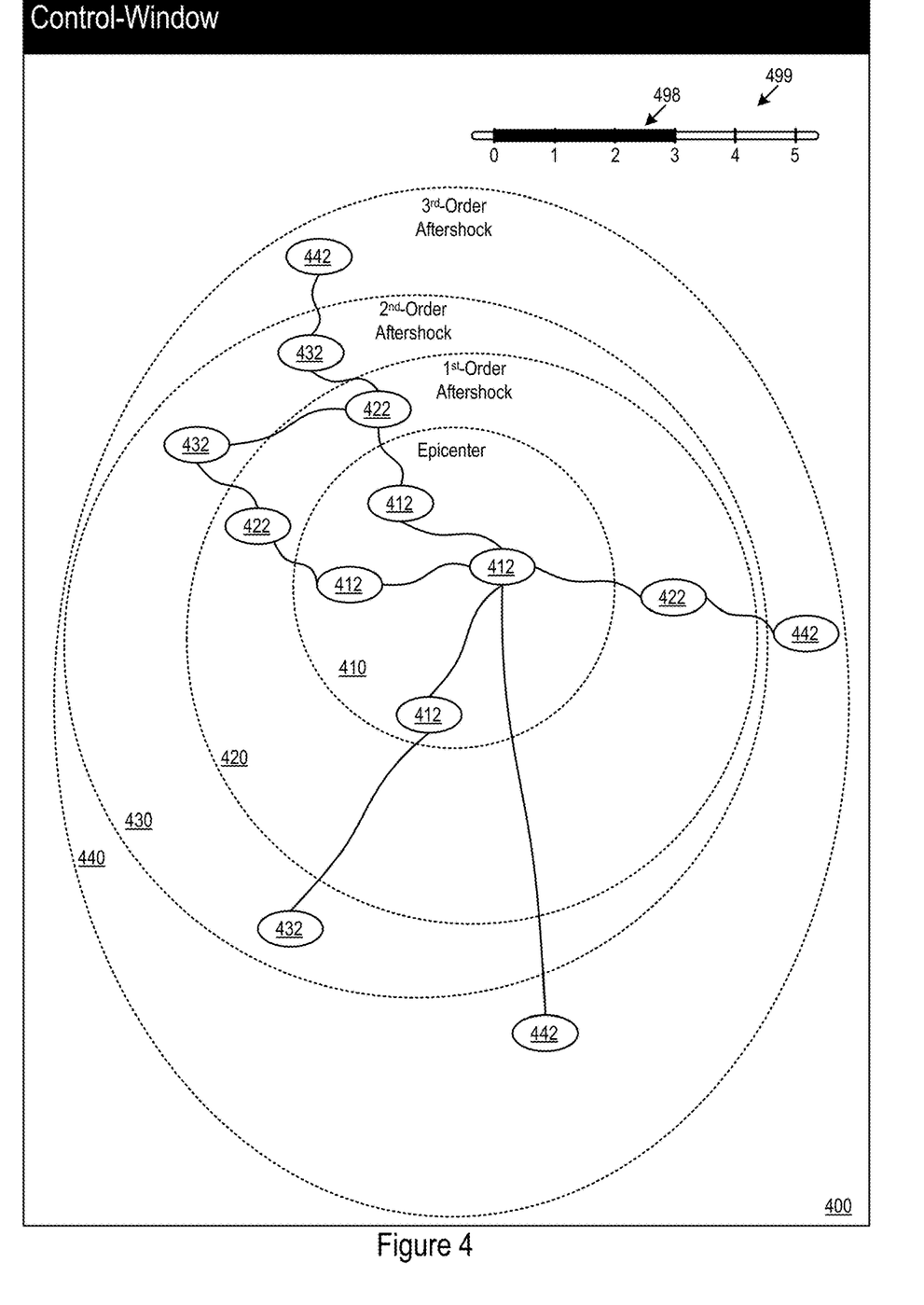
FIG. 4 shows an example control-window display.

FIG. 4 shows an example control-window display 400. In the example control-window display 400, multiple aftershock orders (420, 430, 440) are delineated and aftershock nodes (422, 432, 442) at the various orders are shown. The epicenter 410 is also defined, with epicenter nodes 412 included therein. The control window also includes an input selector 499 allowing a user to select an aftershock order to display. The input selector allows a viewing range 498 to be selected.

Figure 5:
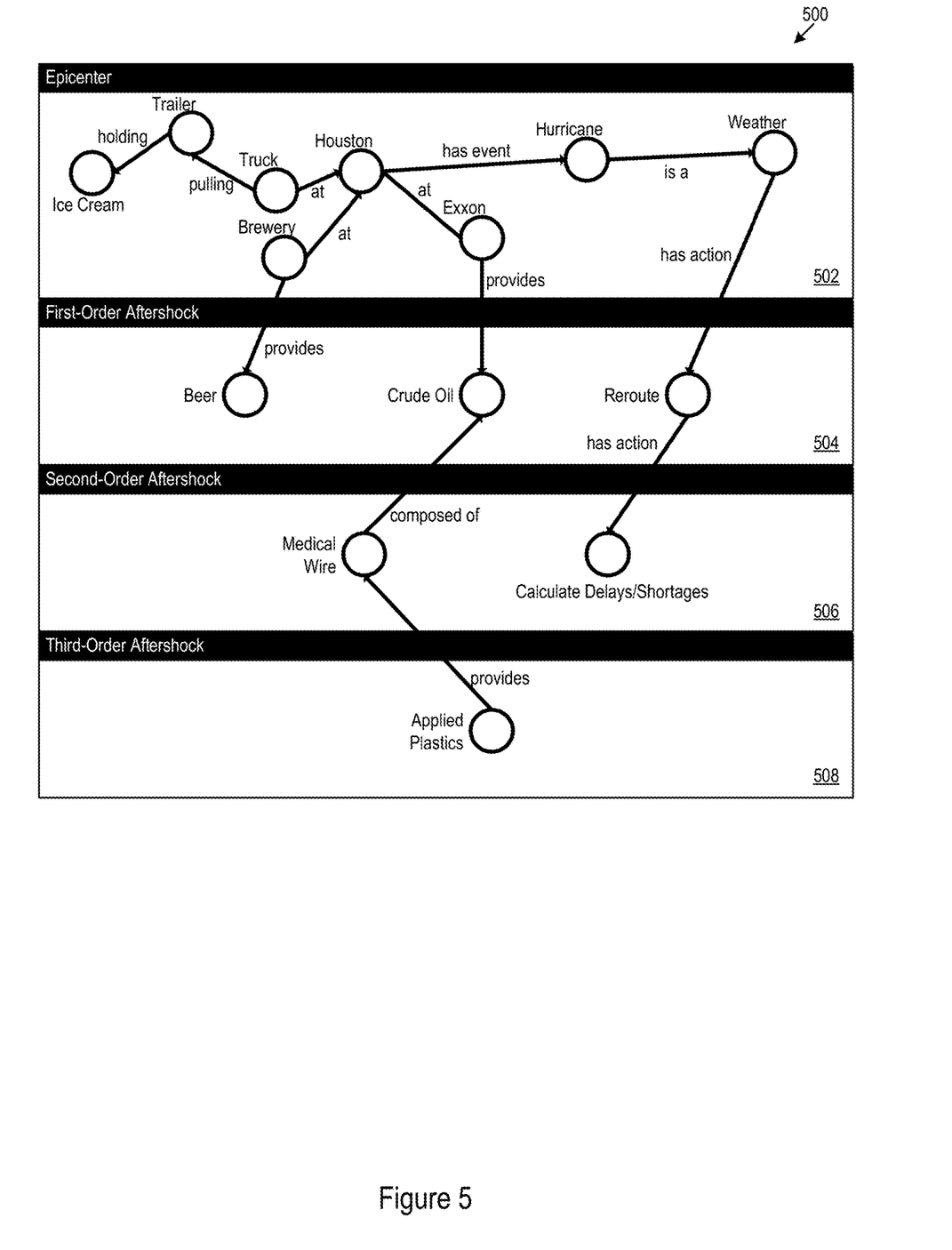
FIG. 5 shows an illustrative example control-window display.

FIG. 5 show an illustrative example control-window display 500 in which an example ERS implementation is applied to a hurricane active event. The hurricane active event is a model of Hurricane Harvey hitting Houston. Epicenter: Houston endures a natural disaster. Hurricane Harvey strikes Houston and has effects on companies, logistics, and products in transfer (502). First-order aftershock: There are effects to products manufactured by companies residing in the wake of the hurricane (e.g. Oil refineries will close, beer will stop being produced) (504). Second-order aftershock: There is a closure of a company means that it will not produce a product that will effect another product being manufactured (506). Third-order aftershock: 'Applied Plastics' will need to find other suppliers of oil for plastics production or suffer potentials delays depending on available stock (508).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. Headings and/or subheadings used herein are intended only to aid the reader with understanding described implementations.

What is claimed is:

1. A method including:
   at an input layer of an event reach stack receiving active event data associated with an active event;
   at a semantic layer of the event reach stack:
   accessing the active event data from the input layer;
   parsing the active event data to determine event phrases;
   performing a semantic comparison of the event phrases with existing nodes on a knowledge layout;
   based on a semantic proximity to the existing nodes, determining an epicenter for the active event;
   at an analytics model layer of the event reach stack:
   for an epicenter node within the epicenter, determining an epicenter magnitude of an epicenter effect based on the active event data;
   traversing the knowledge layout to identify a first-order aftershock node that is operationally-dependent on the epicenter node and outside of the epicenter; and
   based on the epicenter magnitude, determining a first-order aftershock magnitude;
   based on the first-order aftershock magnitude, successively determining aftershock magnitudes of increasing order until an negligible-order aftershock node with a negligible-order magnitude is found, the negligible-order aftershock magnitude being below a predefined threshold;
   at a focus response layer of the event reach stack:
   obtaining a first descriptor for a first robotic task applicable to a first physical resource represented by a first node with an aftershock order below the negligible-order aftershock;
   obtaining a second descriptor for a second robotic task applicable to a second physical resource represented a second node with an aftershock order above the negligible-order aftershock;
   based on the aftershock order of the first node, marking the first robotic task for execution; and
   based on the aftershock order of the second node, disallowing execution of the second robotic task.

2. The method of claim 1, further including, at a presentation layer of the event reach stack:
   generating a control-window, the control-window configured to display multiple nodes of the knowledge layout classified with regard to epicenter inclusion, aftershock order, or both.

3. The method of claim 2, where the control-window is configured to display nodes in the knowledge layout in accord with a user-selected aftershock order.

4. The method of claim 3, where the control-window is configured to display nodes with an aftershock order at or below that user-selected aftershock order.

5. The method of claim 2, where the control-window is configured to display nodes with an aftershock magnitude equal-to or greater than the negligible-order aftershock magnitude.

6. The method of claim 1, where:
   a material-source node representing a material source is included in the epicenter of the active event; and
   traversing the knowledge layout to identify a first-order aftershock node, includes identifying a manufacturing-plant node for which an effect of the active event on the material-source node causes a first-order aftershock at the manufacturing-plant node.

7. The method of claim 1, where the active event has a geographically-localized epicenter.

8. The method of claim 1, where the active event has an operationally-defined epicenter.

9. The method of claim 1, where the first robotic task, the second robotic task, or both include a redirection of a physical shipment.

10. The method of claim 1, where traversing the knowledge layout to identify a first-order aftershock node includes evaluating an aftershock magnitude at a node neighboring an epicenter node.

11. The method of claim 1, where multiple aftershock orders are defined by order threshold magnitudes.

12. The method of claim 11, where the order threshold magnitudes include thresholds defined in relation to the epicenter magnitude, predefined magnitudes, or both.

13. The method of claim 1, where multiple aftershock orders are defined in relation to knowledge layout proximity to one or more epicenter nodes.

14. The method of claim 1, where multiple aftershock orders are defined in accord with a temporal ordering of expected occurrences for associated aftershocks.

15. A system including:
   memory; and
   event reach circuitry in data communication with the memory, the event reach circuitry configured to:
   at an input layer of an event reach stack receive active event data associated with an active event;
   at a semantic layer of the event reach stack:
   access the active event data from the input layer;
   parse the active event data to determine event phrases;
   perform a semantic comparison of the event phrases with existing nodes on a knowledge layout;
   based on a semantic proximity to the existing nodes, determine an epicenter for the active event;
   at an analytics model layer of the event reach stack:
   for an epicenter node within the epicenter, determine an epicenter magnitude of an epicenter effect based on the active event data;
   traverse the knowledge layout to identify a first-order aftershock node that is operationally-dependent on the epicenter node and outside of the epicenter; and
   based on the epicenter magnitude, determine a first-order aftershock magnitude;
   based on the first-order aftershock magnitude, successively determine aftershock magnitudes of increasing order until an negligible-order aftershock node with a negligible-order magnitude is found, the negligible-order aftershock magnitude being below a predefined threshold;

at a focus response layer of the event reach stack:
obtain a first descriptor for a first robotic task applicable to a first physical resource represented by a first node with an aftershock order below the negligible-order aftershock;
obtain a second descriptor for a second robotic task applicable to a second physical resource represented a second node with an aftershock order above the negligible-order aftershock;
based on the aftershock order of the first node, mark the first robotic task for execution; and
based on the aftershock order of the second node, disallow execution of the second robotic task.

16. The system of claim 15, where multiple aftershock orders are defined by order threshold magnitudes.

17. The system of claim 16, where the order threshold magnitudes include thresholds defined in relation to the epicenter magnitude, predefined magnitudes, or both.

18. The system of claim 15, where multiple aftershock orders are defined in relation to knowledge layout proximity to one or more epicenter nodes.

19. A product including:
machine-readable media other than a transitory signal; and
instructions stored on the machine-readable media, the instructions configured to, when executed, cause a machine to:
at an input layer of an event reach stack receive active event data associated with an active event;
at a semantic layer of the event reach stack:
access the active event data from the input layer;
parse the active event data to determine event phrases;
perform a semantic comparison of the event phrases with existing nodes on a knowledge layout;
based on a semantic proximity to the existing nodes, determine an epicenter for the active event;
at an analytics model layer of the event reach stack:
for an epicenter node within the epicenter, determine an epicenter magnitude of an epicenter effect based on the active event data;
traverse the knowledge layout to identify a first-order aftershock node that is operationally-dependent on the epicenter node and outside of the epicenter; and
based on the epicenter magnitude, determine a first-order aftershock magnitude;
based on the first-order aftershock magnitude, successively determine aftershock magnitudes of increasing order until an negligible-order aftershock node with a negligible-order magnitude is found, the negligible-order aftershock magnitude being below a predefined threshold;
at a focus response layer of the event reach stack:
obtain a first descriptor for a first robotic task applicable to a first physical resource represented by a first node with an aftershock order below the negligible-order aftershock;
obtain a second descriptor for a second robotic task applicable to a second physical resource represented a second node with an aftershock order above the negligible-order aftershock;
based on the aftershock order of the first node, mark the first robotic task for execution; and
based on the aftershock order of the second node, disallow execution of the second robotic task.

20. The product of claim 19, where the instructions are further configured to cause the machine to:
at a presentation layer of the event reach stack, generate a control-window, the control-window configured to display multiple nodes of the knowledge layout classified with regard to epicenter inclusion, aftershock order, or both.

* * * * *